United States Patent [19]

Hobson

[11] Patent Number: 4,916,858
[45] Date of Patent: Apr. 17, 1990

[54] SELF-WATERING PLANTER

[75] Inventor: Jody A. Hobson, Rocky River, Ohio

[73] Assignee: Rubbermaid Incorporated, Wooster, Ohio

[21] Appl. No.: 81,287

[22] Filed: Aug. 3, 1987

[51] Int. Cl.$^4$ .......................................... A01G 27/00
[52] U.S. Cl. ...................................................... 47/81
[58] Field of Search ............................................ 47/81

[56] References Cited

U.S. PATENT DOCUMENTS

| | | | |
|---|---|---|---|
| 124,207 | 3/1872 | Hess | 47/81 |
| 1,977,827 | 10/1934 | Kneller | 47/81 |
| 2,072,185 | 3/1957 | Schein | 47/81 |
| 2,695,474 | 11/1954 | Barstow | 47/81 |
| 3,222,819 | 12/1965 | Marcan | 47/81 |
| 3,483,656 | 12/1969 | Baumann | 47/62 |
| 3,739,524 | 6/1973 | Rose | 47/81 |
| 3,758,987 | 9/1973 | Crane, Jr. | 47/38.1 |
| 3,775,904 | 12/1973 | Peters | 47/38.1 |
| 3,871,131 | 3/1975 | Berglund | 47/81 |
| 3,988,857 | 11/1976 | Baumann | 47/59 |
| 4,001,967 | 1/1977 | Swift et al. | 47/80 |
| 4,052,818 | 10/1977 | Hagerty | 47/81 |
| 4,083,146 | 4/1978 | Brankovic | 47/71 |
| 4,083,147 | 4/1978 | Garrick | 47/80 |
| 4,212,134 | 7/1980 | Brokamp | 47/82 |
| 4,270,309 | 6/1981 | Baumann | 47/63 |
| 4,420,904 | 12/1983 | Joswig et al. | 47/81 |
| 4,527,354 | 7/1985 | Sellier | 47/81 |
| 4,538,378 | 9/1985 | Roige | 47/81 |
| 4,663,884 | 5/1987 | Zeischegg et al. | 47/59 |

FOREIGN PATENT DOCUMENTS

| | | | |
|---|---|---|---|
| 291269 | 10/1965 | Australia | 47/81 |
| 656820 | 4/1965 | Belgium | 47/81 |
| 0130147 | 1/1985 | European Pat. Off. | |
| 2360594 | 6/1975 | Fed. Rep. of Germany | 47/81 |
| 2702991 | 7/1978 | Fed. Rep. of Germany | 47/59 |
| 2704930 | 8/1978 | Fed. Rep. of Germany | 47/81 |
| 2819871 | 11/1978 | Fed. Rep. of Germany | 47/59 |
| 1301913 | 7/1962 | France | 47/81 |
| 2102897 | 4/1972 | France | 47/81 |
| 657013 | 8/1986 | Switzerland | 47/59 |
| 954175 | 4/1964 | United Kingdom | 47/81 |
| 1098155 | 1/1968 | United Kingdom | 47/81 |
| 1400450 | 7/1975 | United Kingdom | 47/81 |
| 1412225 | 10/1975 | United Kingdom | |
| 1533115 | 11/1978 | United Kingdom | |

OTHER PUBLICATIONS

U.K. Patent Application No. 2,161,357; Jan. 15, 1986; Int. Cl. A01G 27/00.
INTERNATIONAL APPLICATION PUBLISHED UNDER THE PATENT COOPERATION TREATY; International Publication No. WO87/02327; Apr. 23, 1987; Int. Cl. A01G 9/02.
Advertisement: WATERDISC, by City Gardens, Inc., Newton, MA; INTERIORSCAPE, Jan./Feb. 1987, p. 26.
Instruction Sheet: Clear WaterWell, by Decor Corporation Pty Ltd., Victoria, Australia.
Advertisement: Plant Minder, by Erref.
Advertisement: Plant Sitter, by Gardener's Delight; Ontario, Canada.

(List continued on next page.)

Primary Examiner—Deborah L. Kyle
Assistant Examiner—Richard W. Wendtland
Attorney, Agent, or Firm—Renner, Kenner, Greive, Bobak, Taylor & Weber

[57] ABSTRACT

A self-watering planter (10) includes an outer shell (11) and an inner liner (12) nested within the shell (11). A reservoir (21) for water is formed therebetween. A wick (22) transfers water from the reservoir (21) to the plant rooted within liner (12). A water intake and float tube assembly (13) includes an intake column (42) for transmitting water to the reservoir (21). A float tube (25) houses a float rod (27) which carries a float (29) at the bottom thereof giving a visual indication of the level of the water in the reservoir (21) at the top of the assembly (13). A cylinder (41) protects the float (29) from turbulence which might be created when water is transferred to the reservoir (21) through column (42) so that no false readings as to the water level are created.

16 Claims, 2 Drawing Sheets

OTHER PUBLICATIONS

Advertisement: CORALIE by Grosfillex, France.
Advertisement: gxp, by Grosfillex, France.
Advertisement: Gustavsberg Planters, by Gustavsberg; Sweden.
Advertisement: Genie, The Home Gardener, by Hydro-Planter Designs, Inc.; Ontario, Canada.
Advertisement: Hydrokultur, by Leni.
Advertisement: Tropical Planter, by Nutron Manufacturing, Ltd.; Ontario, Canada.
Advertisement: Tropical Planter, by Nutron Manufacturing, Ltd.; Ontario, Canada.
Advertisement: IRIS Planter Ware, by Ohyama Blow Ind. Co., Ltd.; Japan.
Advertisement: Plant Sitter, by Plant Sitter; Long Beach, CA.
Advertisement: Natural Spring Controlled Watering Planters, by Natural Spring; Mountain View, CA.
Advertisement: Plantomat.
Advertisement: Self-Watering Planter, by Tissot Fabricant; France.

SELF-WATERING PLANTER

TECHNICAL FIELD

This invention relates to a planter which includes a reservoir to maintain a supply of water for the plant rooted therein. More specifically, this invention relates to such a planter in which an accurate visible indication of the amount of water in the reservoir can be ascertained even as the reservoir is being filled.

BACKGROUND ART

Planters of the self-watering variety wherein a reservoir of water is maintained for the plant are known. Many are quite simple devices wherein the reservoir is maintained near or around the bottom of the planter and merely filled by pouring water in at an opening at the bottom while visually watching whether the reservoir is filled. At times, other types of indicators are provided but they are usually at a location remote from the filling area such that the user has to attempt to observe two areas at one time. Once filled, the water from the reservoir is transmitted to the roots of the plant through some conventional means. In some instances, a complex valve arrangement is used such that when the soil becomes too dry, a valve opens and water is transmitted to the plant.

In some types of self-watering planters, water is supplied from the top of the planter to a reservoir at the bottom. In some instances there are no means provided to indicate when the reservoir is filled and thus detrimental overfilling often occurs. In instances when some type of indicator is provided, if it is at the top of the planter, it is usually remote from the fill location and takes up valuable soil space. If it is not remote from the fill location, the turbulence created in the reservoir by the filling action will cause false readings in the indicator again potentially resulting in overfilling.

Furthermore, whenever such a planter is provided with an indicator, and particularly when the indicator is at the top of the planter, it is exposed to being damaged or otherwise rendering false readings by contact from external sources such as the leaves of the plant itself.

In addition, many bottom reservoir planters are constructed as one piece. As such, there is no access to the reservoir and thus no easy way to clean the reservoir to remove mineral deposits or scum which often accumulate in the water reservoir.

Thus, to date, no planter of the self-watering type has been developed which can be economically manufactured with a minimum of parts, and which conveniently give reliable readings of the water level in the reservoir, without taking up valuable soil space, even during the time the reservoir is being filled.

DISCLOSURE OF THE INVENTION

It is thus a primary object of the present invention to provide a self-watering planter having a water reservoir at the bottom thereof which is filled from the top of the planter without causing turbulence in the water in the area of a water level float provided in the reservoir resulting in false movements of the float.

It is another object of the present invention to provide a self-watering planter, as above, in which the movement of the float indicative of the water level in the reservoir is reflected by an indicator located at the top of the planter.

It is a further object of the present invention to provide a self-watering planter, as above, in which both the water intake area and the indicator are at the same location at the top of the planter so as to create a convenient filling and monitoring situation and so as not to take up valuable soil space.

It is yet another object of the present invention to provide a self-watering planter, as above, in which the float indicator at the top of the planter is protected from giving false readings due to outside influences.

It is an additional object of the present invention to provide a self-watering planter, as above, which may be readily disassembled for easy access to the reservoir and other areas for cleaning the same.

It is a still further object of the present invention to provide a self-watering planter, as above, which can be economically manufactured without the need of complex, expensive parts.

These and other objects of the present invention, which will become apparent from the description to follow, are accomplished by the improvements hereinafter described and claimed.

In general, a self-watering planter according to the concept of the present invention has a reservoir at the bottom thereof to hold a supply of water for the plant rooted in the planter. Intake means are provided to transmit water from the top of the planter to the reservoir to fill the same. The water in the reservoir can then be transmitted at a controlled rate to the plant in the planter. A float indicator means in the reservoir is generally vertically movable therein to provide a visual indication as to the amount of water in the reservoir. A turbulence protection device is also provided in the reservoir to protect the float indicator means from water turbulence which might be caused when the reservoir is being filled through the intake means.

PREFERRED EMBODIMENT FOR CARRYING OUT THE INVENTION

Figure 1:
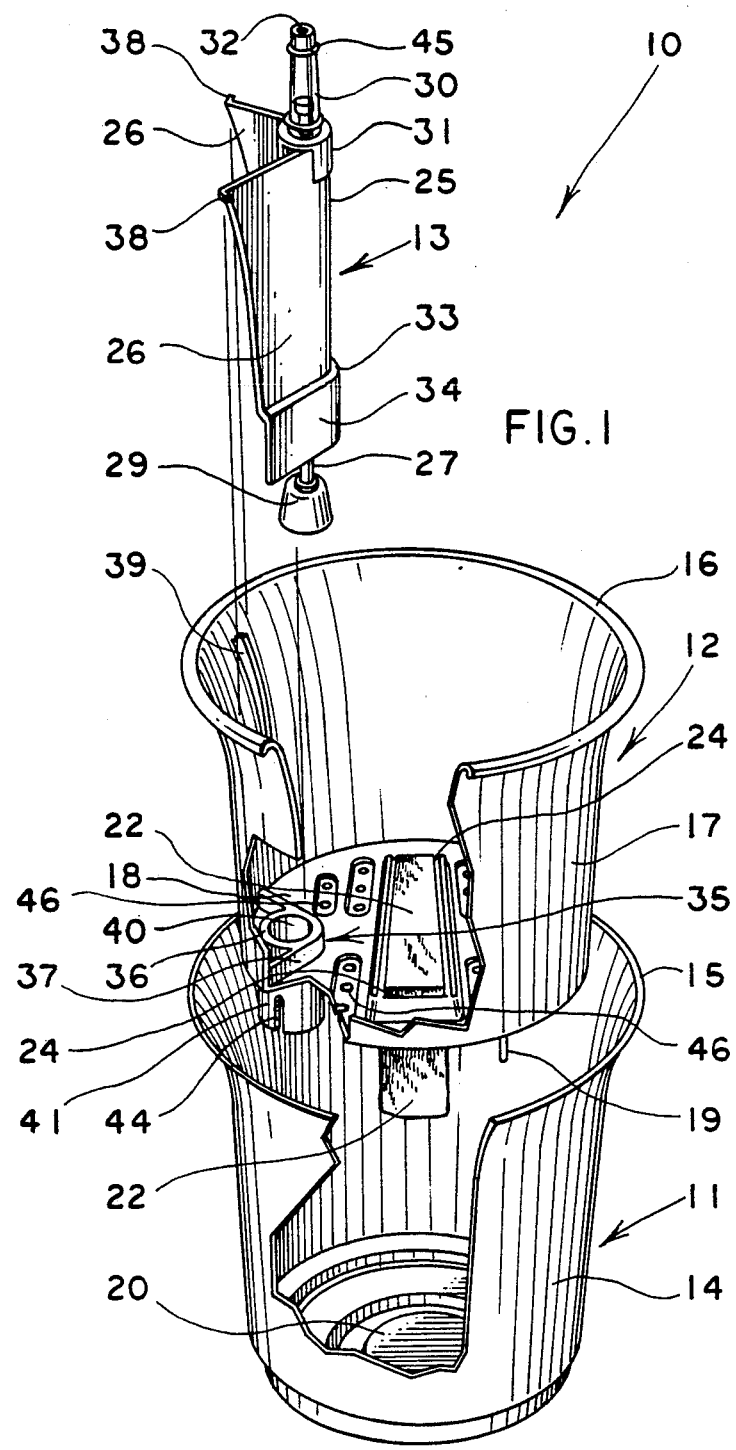
FIG. 1 is an exploded perspective view of the self-watering planter according to the present invention having portions of some of the components thereof broken away.

The self-watering planter according to the concept of the present invention is indicated generally by the numeral 10 in the drawings and, as best shown in FIG. 1, includes an outer shell 11, an inner liner 12 and a water intake and float tube assembly 13. Outer shell 11 can be configured much like any conventional planter with the outer sidewall 14 thereof, if desired, being provided with any decorative pattern. While the outer wall 14 is shown as being somewhat circular or cylindrical in nature, it should be appreciated that an outer shell 11 of square, rectangular or other configuration could be utilized without departing from the spirit of this invention. Outer wall 14 of shell 11 terminates at its upper open end with an outturned rim 15 adapted to engage a downturned flange 16 at the top of the outer wall 17 of liner 12. Like outer wall 14 of shell 11, outer wall 17 of liner 12 can be of any configuration, preferably, but not necessarily, matching the configuration of wall 14 so that liner 12 can nest within and be supported by shell 11.

Figure 2:
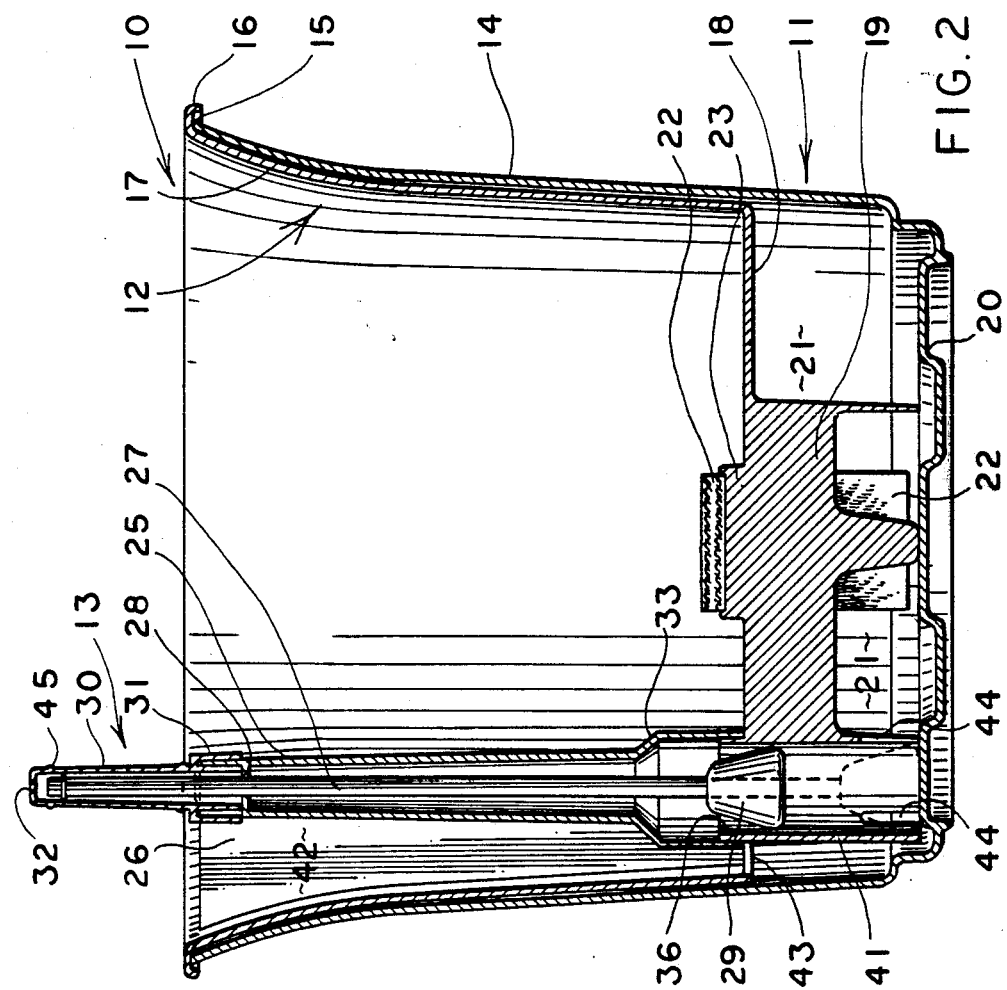
FIG. 2 is a vertical sectional view of the self-watering planter in assembled condition.

As best shown in FIG. 2, the bottom 18 of liner 12 can be provided with feet 19 which can rest against portions of the contoured bottom surface 20 of shell 11 so that all of the weight of liner 12 is not carried by rim 15 of shell 11. When nested, the space between bottom 18 of liner 12 and bottom surface 20 of shell 11 forms a reservoir 21 for water for the plant rooted in liner 12.

Water in reservoir 21 is conveyed to the roots of the plant in liner 12 by way of a conventional wick material 22 which can be positioned on a rectangular platform 23 molded into bottom 18 of liner 12. The ends of the wick material 22 extend downwardly through slots 24 (FIG. 1) at the ends of platform 23 and into reservoir 21 so that water in reservoir 21 may be picked up by capillary action of the wick and transmitted to the root system of the plant.

Water is provided to reservoir 21 through water intake and float tube assembly 13 now to be described in detail. As best shown in FIG. 1, assembly 13 includes a somewhat tapered, generally cylindrical, hollow, open-ended float tube 25 having wings 26 extending generally tangentially therefrom. A float rod 27 is centered within tube 25, as by a centering ring 28 (FIG. 2), and carries a float 29 made of a conventional buoyant material. The length of float rod 27 is such that float 29 is always within water reservoir 21, as will hereinafter be described, and the top of rod 27 will always extend up through the top of float tube 25 and into a clear plastic indicator cap 30 snapped over top of wings 26 and the float tube 25, as at 31. In addition to providing a visual indication as to the location of float rod 27, cap 30 also serves to protect the rod from accidental displacement, as by the leaves of the plant. An air hole 32 can be provided at the top of cap 30 to prevent condensation from clouding the otherwise transparent nature of cap 30.

The bottom of float tube 25 is provided with a mounting collar 33. Likewise, the bottom of wings 26 are provided mounting shoulders 34 extending generally tangentially outward from collar 33. Together, collar 33 and shoulders 34 form a socket to be received over and mate with a correspondingly shaped plug or raised platform 35 (FIG. 1) having a circular portion 36 and wing portions 37 molded into the bottom 18 of liner 12. As shown in FIG. 1, when assembly 13 is nested over platform 35, outturned flanges or hooks 38 at the outer top edge of wings 26 engage clips 39 molded into the inside of wall 17 of liner 12 to assist in holding assembly 13 in a vertical position with the outer edges of wings 26 snugly engaging the correspondingly shaped inside of wall 17.

Circular portion 36 of platform 35 has a circular opening 40 therein and continues downwardly into reservoir 21 as a float protecting cylinder 41. Float rod 27 extends through opening 40 and into cylinder 41 and float 29 is, at all times, totally confined within cylinder 41.

When water intake and float tube assembly 13 is properly positioned within liner 12, a water intake column 42 is formed between wings 26 and the inside of wall 17 of liner 12. With reservoir 21 empty, float 29 will essentially rest on the bottom surface 20 of shell 11 in the chain line position shown in FIG. 2. As water is poured into intake column 42, it passes through an opening 43 in the bottom 18 of liner 12 and into reservoir 21. Float 29 is not disturbed by any turbulence created by the water splashing into reservoir 21 because of the protection afforded by cylinder 41. As reservoir 21 begins to fill with water, and because float 29 is positioned immediately adjacent to intake column 42, water can immediately enter within cylinder 41 around the bottom thereof, where it is not in contact with contoured bottom surface 20 of shell 11, and also through a plurality of circumferentially spaced vertical slots 44 in the sidewall of cylinder 41. Float 29 will thereby rise smoothly within cylinder 41 with float rod 27 correspondingly rising in clear indicator cap 30 giving the user an immediate indication of the water level in reservoir 21. When the top of rod 27 is aligned with a "full" indicator line on cap 30, as at 45, the user knows that the reservoir is sufficiently filled, as shown in the solid line position of FIG. 2.

Normally, such sufficient filling leaves an air gap of about one-quarter inch between the top of the water in reservoir 21 and the bottom 18 of liner 12. This permits the roots of the plant in liner 12 to breathe through a plurality of holes 46 (FIG. 1) in the bottom 18 of liner 12. Holes 46 also serve to permit the user to water, if desired, not through the water intake column 42 but directly onto the soil carrying the plant with any excess water passing through holes 46 and into reservoir 21.

It should thus be appreciated that a self-watering planter constructed according to the concept of the present invention represents a substantial improvement in the art and otherwise accomplishes the objects of the present invention. While the preferred embodiment of the present invention has been described herein, the teachings herein are not intended to be so restricted. Other embodiments which might utilize the teachings herein set forth are intended to be within the scope of the subject invention.

I claim:

1. A planter comprising an outer shell having a sidewall and a bottom, an inner linear having a sidewall and a bottom and being nested within said outer shell, said bottom of said outer shell and said bottom of said inner liner being spaced to form a reservoir for water, a water intake and float tube assembly defining a water intake column for transmitting water from the top of the planter to said reservoir, means to transmit water in said reservoir to the inside of said inner liner, float indicator means in said water intake and float tube assembly and extending into said reservoir, said float indicator means being generally vertically movable dependent on the amount of water in said reservoir, said water intake and float tube assembly including a hollow open-ended tube extending generally from the top to the bottom of said inner liner, said float indicator means being within said tube and extending through the open ends thereof, said water intake and float tube assembly also including wings extending generally tangentially from said tube and defining, with the sidewall of said inner liner, said water intake column, and means in said reservoir to protect said float indicator means from turbulence which might be caused when water is provided to said reservoir through said water intake column.

2. A planter according to claim 1 wherein said float indicator means includes a float rod within said tube and extending through the open end thereof.

3. A planter according to claim 2 wherein said float indicator means includes a transparent cap positioned on said tube and around the top of said float rod.

4. A planter according to claim 2 wherein said float indicator means includes a float attached to the lower end of said float rod in said reservoir.

5. A planter according to claim 4 wherein said means in said reservoir to protect said float indicator means includes a hollow cylinder surrounding said float.

6. A planter according to claim 5, said hollow cylinder having at least one slot therein to expose said float to water in said reservoir.

7. A planter according to claim 1 further comprising means to support said inner liner within said outer shell.

8. A planter according to claim 7 wherein said means to support includes an outturned upper rim on the sidewall of said outer shell and a downturned flange on the upper end of the sidewall of said inner liner, said downturned flange engaging said outturned upper rim.

9. A planter according to claim 7 wherein said means to support includes feet members on the bottom of said inner liner and resting on the bottom of said outer shell.

10. A planter according to claim 1 further comprising means to mount said water intake and float tube assembly to said inner liner.

11. A planter according to claim 10 wherein said means to mount includes clips in the sidewall of said inner liner and hooks on the edges of said water intake and float tube assembly, said hooks engaging said clips.

12. A planter according to claim 11 wherein said means to mount includes plug means in the bottom of said inner liner, said water intake and float tube assembly engaging said plug means.

13. A planter according to claim 1 wherein the bottom of said inner liner has holes therein for air to pass from said reservoir to within said inner liner.

14. A planter according to claim 1 wherein the bottom of said inner liner has at least one slot therein, said means to transmit including a wick positioned in said inner liner and extending through said slot and into said reservoir.

15. A planter comprising an outer shell having a sidewall and a bottom, an inner liner having a sidewall and a bottom and being nested within said outer shell, said bottom of said outer shell and said bottom of said inner liner being spaced to form a reservoir for water, a water intake and float tube assembly defining a water intake column for transmitting water from the top of the planter to said reservoir, means to transmit water in said reservoir to the inside f said inner liner, float indicator means in said water intake and float tube assembly and extending into said reservoir, said float indicator means being generally vertically movable dependent on the amount of water in said reservoir, means to mount said water intake and float tube assembly to said inner liner, said means to mount including clips in the sidewall of said inner liner and hooks on the edges of said water intake and float tube assembly, said hooks engaging said clips, and means in said reservoir to protect said float indicator means from turbulence which might be caused when water is provided to said reservoir through said water intake column.

16. A self-watering planter for a plant contained therein comprising an outer shell and an inner liner nested within said outer shell, said outer shell and said inner liner being spaced to form a reservoir for water, a water intake and float tube assembly defining a water intake column for transmitting water from the top of the planter through an opening in said inner liner to said reservoir, said inner liner including a platform for receiving said water intake and float tube assembly, said platform having a circular portion integral therewith, means to transmit water in said reservoir to the plant contained in the planter, float indicator means in said water intake and float tube assembly and extending into said reservoir, said float indicator means being generally vertically movable dependent on the amount of water in said reservoir, and hook means to mount said water intake and float tube assembly relative to said reservoir.

* * * * *

UNITED STATES PATENT AND TRADEMARK OFFICE
CERTIFICATE OF CORRECTION

PATENT NO. : 4,916,858
DATED : April 17, 1990
INVENTOR(S) : Jody A. Hobson

It is certified that error appears in the above-identified patent and that said Letters Patent is hereby corrected as shown below:

Claim 1, Column 4, line 36, "linear" should read --liner--.

Claim 15, Column 6, line 6, "f" should read --of--.

Signed and Sealed this

Seventeenth Day of September, 1991

Attest:

HARRY F. MANBECK, JR.

Attesting Officer

Commissioner of Patents and Trademarks